May 7, 1935.   H. R. SCHENCK, JR   2,000,895
MOTION PICTURE CAMERA
Filed Aug. 26, 1932   2 Sheets-Sheet 1
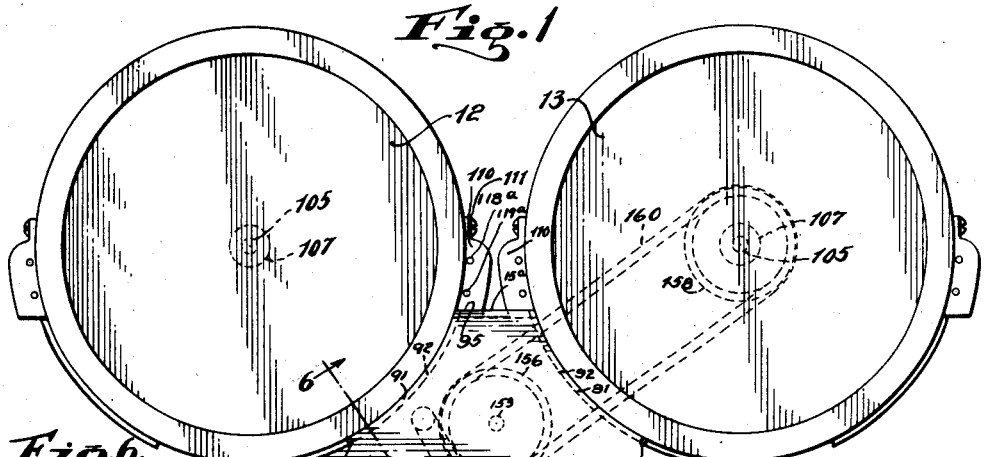

May 7, 1935.  H. R. SCHENCK, JR  2,000,895
MOTION PICTURE CAMERA
Filed Aug. 26, 1932  2 Sheets-Sheet 2

INVENTOR.
Harry R. Schenck Jr.
BY
ATTORNEY.

Patented May 7, 1935

2,000,895

UNITED STATES PATENT OFFICE 2,000,895

MOTION PICTURE CAMERA

Harry R. Schenck, Jr., Palisade, N. J.

Application August 26, 1932, Serial No. 630,517

2 Claims. (Cl. 88—18.4)

This invention relates to cameras, and is particularly directed to a camera for taking moving pictures, and the like article.

An object of this invention is to provide in a camera of the character described wherein film is fed intermittently across a shutter, highly improved means for retaining the film stationary, while the shutter is open, during the photographing operation.

A further object of this invention is to provide in a camera of the character described, an improved lens holder adapted to permit a quick change of the lens used for the photographing operation.

A still further object of this invention is to provide in a camera of the character described, improved film holders or reels so constructed as to be readily mountable on or demountable from the camera, and which furthermore, may be used as either the film feeding reel or the rewind reel.

Another object of this invention is to provide highly improved means for actuating the film for taking moving pictures, for example, of the character described in my co-pending application, Serial No. 623,341, filed July 19th, 1932.

Yet another object of this invention is to provide a camera of the character described which is so constructed that it may be actuated either by an electric motor or manually, and which is further provided with means for taking only a single picture at a time.

Still another object of this invention is to provide a compact and rugged camera of the character described which shall be comparatively inexpensive to manufacture, comprise few and simple parts, which shall be easy to assemble, smooth in operation, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a camera embodying the invention;

Fig. 2 is a front elevational view of the camera shown in Fig. 1;

Fig. 5 is a cross-sectional view taken on line 5—5 of Fig. 3;

Fig. 6 is a cross-sectional view taken on line 6—6 of Fig. 1; and

Fig. 7 is a cross-sectional view taken on line 7—7 of Fig. 3.

Figure 3:
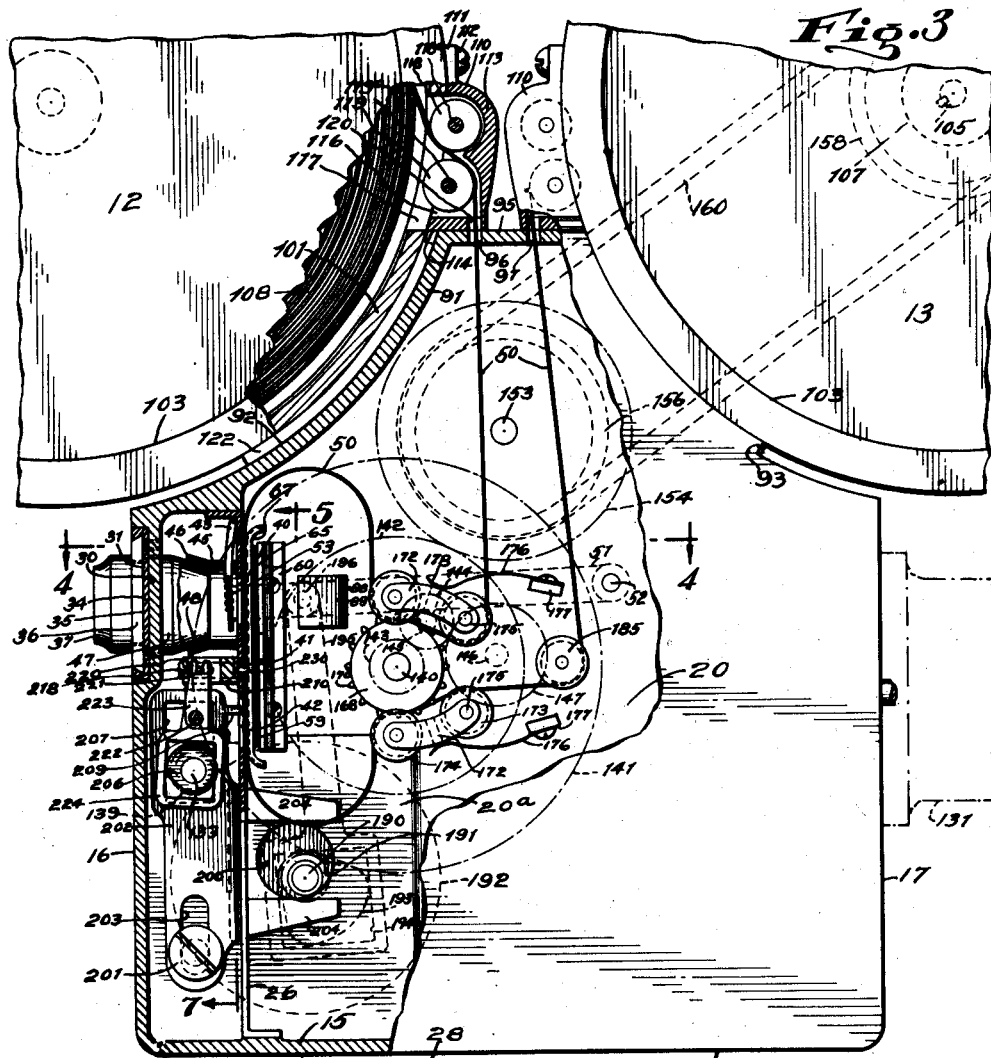
Fig. 3 is a partial, side elevational view of the camera shown in Fig. 1 with parts broken away to show the interior construction.

Referring now in detail to the drawings, 10 designates a motion picture camera embodying the invention, here shown as comprising a box or casing 11 on which is mounted a reel 12 from which film is unwound, and a reel 13 for rewinding the film as said film is photographed. The casing 11 comprises a bottom wall 15, a top wall 15a, a front wall 16, a rear wall 17 and side walls 18 and 19. The casing is further provided with a vertical wall or partition 20 interconnecting the front and rear walls and parallel to the side walls 18 and 19, and dividing the casing into two main chambers 22 and 23, said partition being recessed as at 20a for the purpose hereinafter appearing. The chamber 23, however, is divided by a vertical wall 26 contacting the partition 20 and the side wall 19 and disposed parallel to the front wall 16 and adjacent thereto, and forming a chamber 27 adjacent said front wall.

The bottom wall 15 is provided with a boss or thickened portion 28 adapted to receive the tripod or other support for the camera. The front wall 16 is provided with a horizontal, rearwardly depressed wall portion 30 forming a horizontal groove 31, for the purpose hereinafter appearing. Said front wall 16 is furthermore provided with a circular opening 32 formed in said recessed wall 30, and communicating with the chamber 27 adjacent the upper end thereof.

Mounted within said groove 31 is a plate 34 having a groove 35 of dove-tailed, vertical cross-section, said plate 34 being fixed to the recessed wall 30 by means of screws (not shown) or in any other suitable manner. Slidably mounted within said dove-tailed groove 35 is a horizontal lens holder 36 carrying a plurality of spaced lenses 37. It will now be readily seen that any one of the lenses 37 may be moved to superimposing position with respect to the opening 32. In this manner, the lenses may be changed quickly and readily by merely causing sliding movement of the plate 34.

The vertical wall 26 is provided with a shutter opening 40 adjacent the top end thereof aligned with the opening 32 in the front wall 16. Said vertical wall 26 is further provided with a small opening 41 beneath said opening 40 for the purpose hereinafter stated, and with a slot 42 below said opening 40. The partition wall 20 is provided with a slightly curved slot 43 adjacent the wall 26 and disposed close to and extending somewhat above the shutter opening 40, the purpose of said slot being hereinafter explained. Fixed to the wall 20 and extending within the chamber 27 is a cylindrical member 45 surrounding the shutter opening 40 and having an outwardly flaring end portion 46. Received within the opening 32 in the recessed wall 30 and likewise extending into said chamber 27 is a cylindrical member 47 having an inwardly flaring end portion 48 extending within said outwardly flaring portion 46 of the member 45. Thus, light may pass through the lens opening 32, through the members 45 and 47 to the shutter opening 40.

As will be explained hereinafter in greater detail, a strip of film 50 is caused to be intermittently fed behind the wall 26 so that each time the film is held stationary, an exposure may be made. For covering the shutter opening 40 each time the film is being moved, there is provided an elongated shutter member 51 pivoted to the wall 20 as at 52 and extending parallel to said wall 20. The member 51 further is provided with a portion 53 bent substantially at right angles to said wall 20 and extending through the curved opening 43. The portion 53 is adapted in the lower position of the shutter member 51 to cover the shutter opening 40 and to uncover said opening when moved upwardly, to expose the film. The cylindrical member 45 as shown in Figs. 3 and 4 of the drawings, is provided with a suitable slot 54 for receiving the portion 53 of the shutter.

The film 50 may be of any suitable construction, for example, such as shown in my copending application aforementioned, and provided with a row of substantially square spaced sprocket openings 56 adjacent one edge thereof. For pressing the film against the wall 26, there is provided a gate 58 comprising a plate member 59 hinged adjacent one edge thereof, as at 60 to the wall 20. Said plate 59 is provided with an opening 62 aligned with the shutter opening 40 so as to permit light to pass through the film when the shutter 53 uncovers said shutter opening 40. Attached to substantially the mid-portion of said plate by means of a screw 64 is a substantially H-shaped spring 65 having two pairs of oppositely extending spaced arms, the ends of which are bent away from the plate 59. Attached to said ends is a plate 67 curved at the upper and lower ends thereof and resiliently pressed by said spring arms against the film which passes between said plat and the wall 26, the film being thus pressed by said plate against said wall. The gate 58 may be swung away from the wall 26 to permit the film to be inserted in position or removed therefrom.

Figure 4:
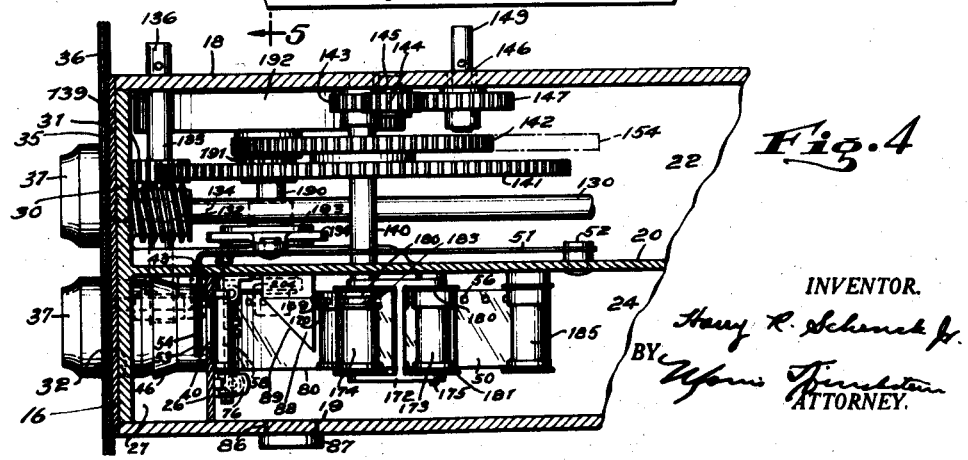
Fig. 4 is a cross-sectional view taken on line 4—4 of Fig. 3.

Means is provided for holding the gate in the position shown in Figs. 3, 4, and 5 for pressing the film against the wall 26. To this end, there is fixed to said wall 26, a block 70 adapted to be contacted by an extension or finger 71 projecting from the edge of the plate 59. Fixed to said wall 26 and disposed above said plate 70 is a small casing 74 housing a slidably mounted spring pressed latch bolt 75 adapted to engage the finger 71 for pressing the same against the block 70. The gate may be released by pulling upwardly on the handle 76 at the upper end of the latch bolt as is clearly indicated in Fig. 5 of the drawings.

For retaining the film in proper position with respect to the shutter opening 40, there is attached to said block 70 a looped spring 78 having a vertical portion 79 adapted to contact one edge 80 of said film. A vertical strip 83 may be fixed to the wall 26 adjacent the partition 20 for contacting the opposite edge 84 of said film. The film is thus properly aligned so that the pictures photographed thereon may be accurately framed. The plate 67 is provided with a suitable opening aligned with the shutter opening 40 and opening 62 in the plate 59 to permit light to pass through the lens and through the shutter opening and film.

Means is provided for viewing the film from the side of the camera. To this end the side wall 19 of the camera is provided with a window opening 86 on which may be mounted a viewing lens 87. Mounted on the wall 20 and disposed within the chamber 24 is a prismatic member 88 having an inclined mirrored surface 89 set at 45° to the axis of the opening 86 and also at 45° to the axis of the opening 32. Thus, by looking through the viewing lens 87, the object to be photographed may be readily seen in the reflecting surface 89.

For supporting the reels 12 and 13, the top-wall 15a of the casing is provided with a pair of arcuate symmetrically disposed recessed wall portions 91 adjacent the side wall 19 of said casing. Each of said arcuate walls is provided with a curved slot or groove 92 of dove-tail transverse cross-section, terminating as at 93 short of the front and rear walls 16 and 17 of the casing. The extent of the arcuate grooves is preferably less than 60°, for the purpose hereinafter stated. The top wall portion 95 of the casing which extends between the curved portions 91 is provided with a pair of diametrically disposed parallel slots 96 and 97 parallel to the front and rear walls of the casing and adapted to receive the strip of film 50 therethrough.

The reels 12 and 13 may be substantially similar in construction and are interchangeable so that each reel may be mounted on each of the arcuate walls 91. The reel 12 comprises a cylindrical casing 100 having a cylindrical wall 101 and a circular end wall 102; and screwed to said cylindrical wall is a cover 103. Rotatably mounted on and between the walls 102 and 103 on said housing 100, is a transverse axial shaft 105 to which there is fixed a spindle or roller 107 provided with any suitable means for engaging the inner end of the roll of film 108. Attached to diametrically opposite points on the outer surface of the cylindrical wall 101, but extending in the same direction with respect to the diameter through the points of attachment, are a pair of similar members 110. Each member 110 is provided with an ear 111 receiving the screw 112 which attaches said member to the cylindrical wall 101. Each member 110 furthermore comprises a portion 113 having an end surface 114 adapted to contact the wall portion 95.

Of course, as shown in Fig. 1 of the drawings, the member 110 on the right of the reel 12 contacts the top wall portion 95 of the casing. However, should said reel 12 be interchanged with the reel 13 in the manner explained hereinafter, the member 110 at the left of said reel 12 would contact said wall portion 95 of said casing. Each member 110 as shown in Fig. 3 of the drawings, is hollow and is provided with an inner open side 116, the cylindrical wall 101 being provided with slots or openings 117 aligned with the open sides of said members 110. The recess in each of said hollow members 110 is so shaped as to partially receive a pair of rollers 118 and 119 rotatably mounted on transverse shafts 118a and 119a. Thus, the strip of film 50 from the roll 108 passes beneath the upper roller 118 and over the lower roller 119 and extends through a slot 120 formed in the bottom wall 114 of said member 110 and aligned with the slot 96 in said wall 95.

For mounting the reel 12 on the arcuate wall 91, the cylindrical wall 101 thereof is formed with a pair of spaced arcuate flanges 122 of dove-tailed cross-section, each adapted to be slidably received within the groove 92. Each flange 122 may be substantially of the same angle as the groove 92, i. e. less than 60°. Thus, looking at Fig. 1 of the drawings, the reel 12 may be demounted by rotating the same in a counterclockwise direction until the flange 122 is entirely removed from the groove 92. The reel may then be removed sidewise. It will be noted that the arcuate angle of the groove 92 must be smaller than the angle between the adjacent ends of the flanges 122 to permit the reel to be moved sidewise for mounting the reel on or demounting the same from the casing and interchanged, since each reel is provided with a mounting structure on the right and left side thereof. As shown in Fig. 3 of the drawings, the film 50 passes through the opening 96 into the casing and then passes through the opening 97 to the member 110 attached to the reel 13 and then onto the roller or spindle 107 disposed within said reel.

For unwinding the film 50 from the reel 12 and again winding it onto the reel 13 as the film is photographed, there is rotatably mounted in suitable bearings on the front and rear walls 16 and 17 of the casing 11, a horizontal shaft 130, preferably extending beyond the rear wall 17 and being operable by any suitable electric motor 131 preferably demountably attached to said casing. Mounted on said shaft 130 and disposed adjacent the front wall 16 of the casing is a worm 132 fixed to said shaft and rotatable therewith. Mounted in suitable bearings in the side wall 18 and in the partition 20 is a horizontal shaft 133 having fixedly mounted thereon a worm wheel 134 meshing with said worm 132 whereby said shaft 133 may be rotated by the motor 131. Said shaft 133 preferably projects through and beyond said wall 18 as at 136 for removably receiving a hand crank 137 as shown in Figs. 2 and 4 of the drawings, whereby said shaft may be rotated by means of said hand crank instead of by the motor 131. As described hereinafter, one turn of crank 137 will cause a single picture to be taken on the film 50. Obviously, said shaft 130 is preferably movably mounted in the casing to permit the worm 132 to be readily unmeshed from the worm wheel 134, should it be desired to turn the shaft 133 by the hand crank. Fixed to said shaft 133 is a gear 139. A second shaft 140 parallel to said shaft 133 is likewise journaled in suitable bearings in the side walls 18 and in the partition wall 20 and mounted on said shaft is a gear 141 meshing with said gear 139.

Fixed to said shaft 140 for rotation therewith are a pair of spaced gears 142 and 143. The gear 143 is preferably disposed closer to the wall 18 and meshing therewith is a gear 144 mounted on a shaft 145 journaled in a suitable bearing opening in said wall 18. A small shaft 146 likewise journaled in a suitable bearing opening in wall 18 and disposed parallel to said shafts 145 and 140 is provided with a gear 147 fixed thereto and meshing with said gear 144. The shaft 146 preferably projects through said side wall 18 as at 149, said projecting portion of said shaft being adapted to removably receive a hand crank 150. It will thus be clear that the shafts 133 and 140 may be rotated either through the motor 131, or by means of hand cranks 137 or 150. The hand crank 150 is for continuously operating the camera.

Rotatably mounted on said wall 18 of the casing is a shaft 153 on which there is mounted a gear 154 meshing with the gear 142. There is further fixed to said shaft 153 a pulley or wheel 156. Removably mounted on the shaft 105 of the reel 13 in any suitable manner, is a grooved pulley 158 similar to and aligned with the pulley 156. A belt 160 is received over said pulleys whereby rotation of either the motor or the hand cranks will cause the pulleys to rotate for rotating the roller 107 of the rewind reel 13. It will thus be clear that during operation of the machine, the film will be rewound on the reel 13.

For unwinding the film from the reel 12, the shaft 140 projects through the wall 20, and mounted on the projecting portion of said shaft is a sprocket wheel 168. Said sprocket wheel is disposed in the chamber 24 and is formed adjacent one side thereof with an annular rim 169 adapted to receive one edge portion 184 of the film. Said rim flange 169 is provided with a plurality of spaced radially extending sprocket pins 170 preferably of substantially square cross-sectional shape received within the square sprocket openings 56 of the film 50. Adjacent the opposite side thereof said wheel 168 is provided with an annular flange or rim 171 contacting said film 50 adjacent the opposite edge 80 thereof. As shown in Fig. 3 of the drawings, the film 50 passes downwardly into the casing through the opening 96 into engagement with the sprocket wheel 168. For retaining the film in contact with said sprocket wheel, there is provided a frame member 172 on which there is mounted a pair of parallel rollers 173 and 174. The frame 172 is pivoted to the wall 20 by means of a shaft 175 on which the roller 173 is mounted. The film 50 passes around said rollers 173 and 174. The frame further is pressed by means of a spring 176 suitably atached to the wall 20 as at 177 or in any other suitable manner and having an outer free end portion 178 contacting the frame. The frame is thus pivotally moved about the shaft portion 175 thereof for causing the roller 174 to press the film against the sprocket wheel 168. The roller 173 is provided with flanges 180 and 181 contacting the film adjacent the end edges thereof. The roller 174 is likewise provided with flanges 180 and 181 for the same purpose. However, the flange 180 of said roller 174 is formed with a groove 183 for receiving the sprocket pins 170 as the film is being unwound from the reel 12 and fed to the shutter mechanism.

As shown in the drawings, the film passes from the sprocket wheel to the upper end of the gate 58 and between said gate and the wall 26. The film then passes to the underside of the sprocket wheel and is retained in contact therewith by a second frame 172 and its rollers 173 and 174 similar to the upper frame 172.

The lower member 172 is likewise pressed by means of another spring 176 for causing the film to retain engagement with the sprocket wheel. The film 150 passes from the lower side of the sprocket wheel around an idler 185 likewise mounted on the wall 20 and similar in construction to the roller 173.

Means is provided for alternately holding the film stationary while the shutter 53 is in lifted position and said film is exposed, and then moving the shutter down to close the shutter opening and simultaneously advancing the film to present another frame for a photographing operation. To this end, there is journaled in suitable bearing openings in the wall 18 and partition 20, a horizontal shaft 190 carrying a gear 191 meshing with the gear 141 whereby said shaft 190 my be rotated by either the motor 131 or the hand cranks 137 or 150. Mounted on said shaft 190 are also a fly wheel 192 for maintaining the said shaft 190 at a substantially uniform rate of rotation, and a harmonic cam 193 adjacent the recessed portion 20a of the partition 20. Receiving said cam is a yoke 194 having an upstanding arm 195 pivoted at the upper end thereof as at 196 to the shutter member 51. Thus as the shaft 190 is rotated, the yoke member 194 will be moved up and then down and will be maintained periodically in its upper and lower positions for predetermined intervals for retaining the shutter portion 53 in the position shown in Figs. 3 and 4 of the drawings covering the shutter opening 40 and in uncovered position, respectively.

Means is provided for advancing the film or pulling the film downwardly each time the shutter is in the covering position illustrated in Figs. 3 and 4 of the drawings. For this purpose, the shaft 190 projects through the partition portion 20a and mounted on the extending portion of said shaft is an eccentric disc 200 disposed closely adjacent the said partition portion.

Fixed to said partition or wall 20 and projecting into the chamber 27 is a horizontal pin 201. Disposed within said chamber 27 is a member 202 provided with a substantially vertical slot 203 slidably receiving said pin 201 therethrough. Said member 202 is formed furthermore with a pair of parallel arms 204 receiving therebetween the eccentric disc 200 and contacting the edge of said disc at diametrically opposed points. Thus, as the shaft 190 rotates, the disc 200 will cause the member 202 to be moved up and down. As shown in Fig. 3 of the drawings, the cam 193 is so positioned with respect to the disc 200 that the shutter will be maintained in its downmost position while the member 202 is moved from its uppermost position to its lowermost position, and will be maintained in lifted position while the member 200 is moved from its lowermost position to its uppermost position.

For the purpose hereinafter appearing, the shaft 133 projects through the wall 20 into the chamber 27 and mounted on the projecting portion of said shaft is a cam 206 likewise having a harmonic curve and extending through a substantially oblong opening 207 in the member 202, said opening forming a pair of parallel, substantially vertical edges contacting the cammed surface of the cam as the latter is rotated. Thus, as the shafts 133 and 190 are rotated simultaneously, the member 202 will move up and down due to the action of the eccentric disc 200 and will also be pivoted about the pin 201 by action of the cam 206. The cam 206 will maintain the member 202 pivoted to the right as said member is moved downwardly, and pivoted to the left as it is moved upwardly. Extending from the upper end of said member 202 is a pin 209 adapted to extend into the slot 42 of the wall 26. Thus, as the shafts 133 and 190 rotate, the pin 209 will move into the slot 42 adjacent the upper end of the latter and engage one of the sprocket openings in the film 50. Further rotation will cause the member 202 to move downwardly for advancing the film. During this operation, the shutter member 51, 53 will be maintained in its lowermost position to cover the shutter opening 40. However, rotation of the shafts 190 and 133 will cause the member 202 to be pivoted to the left or in a counterclockwise direction for disengaging the film and then lifted while the shutter member is moved upwardly for exposing the film and maintained in its upper position.

Means is further provided for maintaining the film stationary each time the same is exposed. To this end there is attached to the wall 26 and adjacent the wall 20 and within the chamber 27, a block 210 provided with a vertical wall portion 211 and a horizontal wall portion 212 extending to one side from the upper end of said vertical wall portion. The horizontal wall portion 212 is formed with a vertical slot 214 parallel to the wall 20. Said horizontal wall portion 212 is further provided with a horizontal cylindrical through opening 217 perpendicular to the wall 26; and slidably received within said opening is a cylindrical pin 218. The block 210 is provided on both sides of the vertical slot 214 with a pair of aligned horizontal slots 220 receiving therethrough a pin 221 disposed perpendicularly to the wall 20 and fixed to the pin 218. Thus, reciprocation of the pin 221 to the left and right looking at Fig. 3 of the drawings, will cause the cylindrical pin 218 to be reciprocated within the opening 217. The vertical portion 211 of the block 210 is further provided with a horizontal pin 222 projecting to one side thereof; and pivotally mounted on said pin is a lever 223 having a yoke portion 224 receiving the cam 206 therethrough. Thus, the cam 206 is of sufficient width to engage both within the yoke 224 in the opening 207 of the member 222. The lever 223 is provided with an upstanding arm 225 projecting within the slot 214 and having a notched end portion receiving the pin 221. Thus, as the cam 206 rotates, the lever 223 will pivot about the pin 222 for reciprocating the transverse pin 221 and consequently the cylindrical pin 218. It will be seen that when the member 202 pivots about the pin 201 in a clockwise direction, the lever 223 will be pivoted in a counterclockwise direction. Extending from the pin 218 is a lug or projection 230, preferably of square cross-section adapted to project through the opening 41 in the wall 26 and engaged within one of the square shaped sprocket openings in the film. The cam 206 is so arranged that when the shutter 53 is in its upper position and the film is being exposed, the projection 230 will be in engagement with a sprocket opening in the film. While the projection 230 is in engagement with the film, the projection or pin 209 of the member 202 is out of engagement with the film and is being moved upwardly to its upper position. Thus, beginning with the parts in the position shown in Fig. 3 of the drawings, rotation of the shafts 190 and 133 will retain the shutter 53 in covering position. The pin 209 will engage the film and pull the same downwardly and the member 223 will be rotated in a counterclockwise direction for disengaging the projection 230 from the film. After the film has been advanced, further rotation of the shafts 190 and 133 will cause the shutter member 53 to be moved upwardly for uncovering the shutter opening 40 and the projection 209 on the member 202 will become disengaged from the film and then move upwardly and the projection 230 on the cylindrical pin 218 will move into engagement with the film for retaining the same positively against movement while the film is exposed.

The gear 139 is preferably of the same size as the gear 151 so that a single revolution of the shaft 133 will cause a single revolution of the shaft 190. It will now be understood that when the hand crank 137 is turned one revolution, both the shafts 133 and 190 will likewise be rotated one revolution for causing a single picture to be photographed on the film 50.

The casing 11 may be provided with any suitable mechanism for recording sound effects on the strip of film 50. In such case the strip will pass to the sound recording mechanism before passing to the opening 97 for rewinding on the reel 13.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawings, is to be interpreted as illustrative and not in a limiting sense.

Having thus described my invention, I claim as new and desire to secure by Letters Patent:—

1. In a motion picture camera, a casing, a wall mounted therein having a shutter opening, a pair of parallel shafts rotatably mounted within said casing, a member pivoted within said casing and having a portion movable into covering and uncovering position with respect to said opening, a cam mounted on one of said shafts, a yoke receiving said cam and having an arm pivotally connected to said pivoted member whereby upon rotation of said cam, said pivoted member will be moved into and out of said covering position, a pin fixed within said casing, a member having an elongated slot slidably receiving said pin and provided with a pair of parallel arms, an eccentric disc fixed to said first shaft and received between said parallel arms for reciprocating said member, a cam on said second shaft, said member being provided with an opening forming a pair of parallel edges, said last mentioned cam being received within said opening and contacting said edges, means for simultaneously rotating said shafts whereby said member may oscillate about said pin during the reciprocation thereof, and means on said member adapted to engage a strip of film for advancing the same across said shutter opening.

2. In a motion picture camera, a casing, a wall mounted therein having a shutter opening, a pair of parallel shafts rotatably mounted within said casing, a member pivoted within said casing and having a portion movable into covering and uncovering position with respect to said opening, a cam mounted on one of said shafts, a yoke receiving said cam and having an arm pivotally connected to said pivoted member whereby upon rotation of said cam, said pivoted member will be moved into and out of said covering position, a pin fixed within said casing, a member having an elongated slot slidably receiving said pin and provided with a pair of parallel arms, an eccentric disc fixed to said first shaft and received between said parallel arms for reciprocating said member, a cam on said second shaft, said member being provided with an opening forming a pair of parallel edges, said last mentioned cam being received within said opening and contacting said edges, means for simultaneously rotating said shafts whereby said member may oscillate about said pin during the reciprocation thereof, and means on said member adapted to engage a strip of film for advancing the same across said shutter opening, and a lever pivotally mounted within said casing provided with an opening forming parallel edges receiving said last mentioned cam therebetween and a pin on said lever adapted to engage said film to retain the same in stationary position while said shutter opening is uncovered.

HARRY R. SCHENCK, Jr.